United States Patent
Oguchi

(10) Patent No.: US 9,946,961 B2
(45) Date of Patent: *Apr. 17, 2018

(54) IMAGE PRINTING APPARATUS AND METHOD FOR CONTROLLING AN IMAGE PRINTING APPARATUS

(71) Applicant: BROTHER KOGYO KABUSHIKI KAISHA, Nagoya-shi, Aichi-ken (JP)

(72) Inventor: Tomoya Oguchi, Aichi (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/467,850

(22) Filed: Mar. 23, 2017

(65) Prior Publication Data
US 2017/0193341 A1 Jul. 6, 2017

Related U.S. Application Data

(63) Continuation of application No. 15/152,845, filed on May 12, 2016, now Pat. No. 9,614,991.

(30) Foreign Application Priority Data

May 13, 2015 (JP) .................................. 2015-098160

(51) Int. Cl.
G06K 15/02 (2006.01)
G06F 3/12 (2006.01)

(52) U.S. Cl.
CPC ......... *G06K 15/1818* (2013.01); *G06F 3/121* (2013.01); *G06F 3/126* (2013.01);
(Continued)

(58) Field of Classification Search
CPC ............ G06K 15/1818; G06K 15/1821; G06F 3/1207; G06F 3/121; G06F 3/1259;
(Continued)

(56) References Cited

U.S. PATENT DOCUMENTS 5,757,509 A 5/1998 Kubo
5,812,745 A 9/1998 Kim et al.
(Continued)

FOREIGN PATENT DOCUMENTS

JP 2002-73300 A 3/2002

*Primary Examiner* — Allen H Nguyen
(74) *Attorney, Agent, or Firm* — Merchant & Gould P.C.

(57) ABSTRACT

An image printing apparatus including a communication interface, a printer, a user interface including an operation panel, a controller configured to control the printer and the user interface is provided. The controller is configured to receive preliminary data sent from an information processing apparatus through the communication interface; control the printer to perform a warm-up action; receive job data including image data through the communication interface; control the user interface to perform a receipt-notification and control the printer to start printing based on the image data; during a period from the receipt of the preliminary data until start of receiving the job data, withhold from accepting a cancellation command sent in response to user entering a cancellation operation; and after the start of receiving the job data, accept the cancellation command and cancel printing of the image based on the job data associated with to the entered cancellation command.

15 Claims, 11 Drawing Sheets

(52) U.S. Cl.
CPC .......... *G06F 3/1207* (2013.01); *G06F 3/1259* (2013.01); *G06F 3/1268* (2013.01); *G06F 3/1274* (2013.01); *G06F 3/1285* (2013.01); *G06K 15/1821* (2013.01)

(58) Field of Classification Search
CPC ...... G06F 3/126; G06F 3/1268; G06F 3/1274; G06F 3/1285
USPC ....................................................... 358/1.15
See application file for complete search history.

(56) References Cited

U.S. PATENT DOCUMENTS

| | | | |
|---|---|---|---|
| 7,471,408 B2 * | 12/2008 | Ueda | H04N 1/00912 358/1.1 |
| 2008/0266588 A1 | 10/2008 | Inaba | |
| 2009/0091779 A1 | 4/2009 | Ishinaga et al. | |
| 2011/0090517 A1 * | 4/2011 | Togawa | G06F 3/1217 358/1.1 |

\* cited by examiner

IMAGE PRINTING APPARATUS AND METHOD FOR CONTROLLING AN IMAGE PRINTING APPARATUS

CROSS-REFERENCE TO RELATED APPLICATION

This application is a Continuation of U.S. patent application Ser. No. 15/152,845 filed on May 12, 2015, which claims priority under 35 U.S.C. § 119 from Japanese Patent Application No. 2015-098160 filed on May 13, 2015. The entire subject matter of these applications are incorporated herein by reference.

BACKGROUND

Technical Field

The following description relates to one or more aspects of an image printing apparatus and a method for controlling an image printing apparatus.

Related Art

An image printing apparatus, or an image forming apparatus, capable of conducting an image forming operation to form an image on a sheet according to image data, which may be transmitted from an information processing apparatus, is known. In an image forming system, a preparation command for the image forming apparatus to prepare for the image forming operation may be transmitted from the information processing apparatus to the image forming apparatus prior to transmission of the image data. The image forming apparatus in the image forming system may perform a preparatory action, such as cleaning and uncapping to a recording head, in response to receipt of the preparation command.

SUMMARY

In the known image forming system, for example, the image forming apparatus may receive two (2) preparation commands transmitted from two (2) image processing apparatuses successively in a short range of time, or almost at the same time. The image forming apparatus receiving the preparation commands may start a preparatory action for one of the received two preparation commands and may thereafter receive two (2) units of job data, each including image data, transmitted from the image processing apparatuses.

While each preparation command is associated with each job data unit, the image forming apparatus may receive the job data units in a different order from a receiving order of the preparation commands regardless of the association between the preparation command and the job data unit. In such a case, the image forming apparatus may conduct the image forming operation for the job data unit which is received earlier firstly and the image forming operation for the job data unit which is received later secondly. In other words, the image forming apparatus may need to conduct the image forming operations to form images for the image data included in the received job data units in the different order from the receiving order of the preparation commands.

Meanwhile, during a transitive period between activation of the preparatory action and receipt of one of the two job data units, a user of one of the information processing apparatuses may wish to cancel one of the image forming operations and may enter a cancellation command from the information processing apparatus. When the image forming apparatus receives the cancellation command, the job data units may be confused, and the image forming apparatus may cancel the job data unit which was not intended to be canceled.

In order to avoid the confusion, it may be taken into consideration that the image forming system is configured such that the preparation command is associated with the image data, and the image forming apparatus may be able to find the job data unit associated with the cancellation command correctly based on the association so that the job data unit designated by the user may be correctly canceled. However, in order to comply with this cancellation method, processes to be executed by the image forming apparatus and the information processing apparatuses may be complicated.

Aspects of the present disclosure are advantageous in that an image forming apparatus, which may receive preliminary data and job data unit transmitted from an information processing apparatus and may cancel the job data unit correctly in accordance with a cancellation command from a user without complicating a processing flow, is provided.

According to an aspect of the present disclosure, an image printing apparatus including a communication interface configured to communicate with an information processing apparatus; a printer; a user interface configured to notify a user of information, the user interface including an operation panel configured to accept a user operation; and a controller configured to control the printer and the user interface, is provided. The controller is configured to receive preliminary data sent from the information processing apparatus through the communication interface; in response to receipt of the preliminary data, control the printer to perform a warm-up action for warming up the printer; receive job data including image data through the communication interface, the job data being sent after the preliminary data from the information processing apparatus; based on the receipt of the job data, control the user interface to perform a receipt-notification to notify the user of the receipt and control the printer to start printing based on the image data included in the job data; during a period from the receipt of the preliminary data until start of receiving the job data, withhold from accepting a cancellation command, which is sent from the operation panel in response to user entering a cancellation operation; and after the start of receiving the job data, accept the cancellation command and cancel printing of the image based on the job data associated with to the entered cancellation command.

According to another aspect of the present disclosure, a method for controlling an image printing apparatus is provided. The method includes receiving preliminary data through a communication interface of the image printing apparatus, the preliminary data being sent from an information processing apparatus communicated through the communication interface; in response to receipt of the preliminary data, controlling a printer of the image printing apparatus to perform a warm-up action for warming up the printer; receiving job data including image data through the communication interface, the job data being sent after the preliminary data from the information processing apparatus; based on the receipt of the job data, controlling a user interface of the image printing apparatus to perform a receipt-notification to notify the user of the receipt and controlling the printer to start printing based on the image data included in the job data; during a period from the receipt of the preliminary data until start of receiving the job data, withholding from accepting a cancellation command which is sent from an operation panel of the user interface in response to user entering a cancellation operation; and after the start of receiving the job data, accepting the cancellation command and cancel printing of the image based on the job data associated with to the entered cancellation command.

BRIEF DESCRIPTION OF THE ACCOMPANYING DRAWINGS

Figure 3:
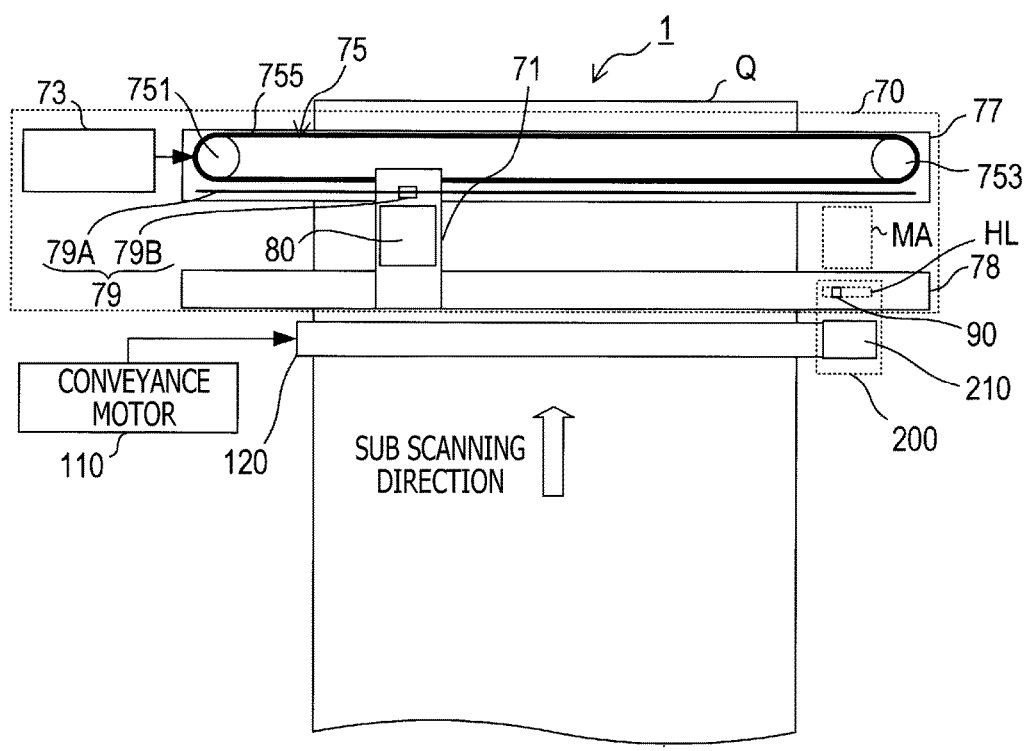

FIG. 3 schematically shows a configuration around a conveyance path of a carriage in the image printing apparatus according to the illustrative embodiments of the present disclosure.

Figure 4:
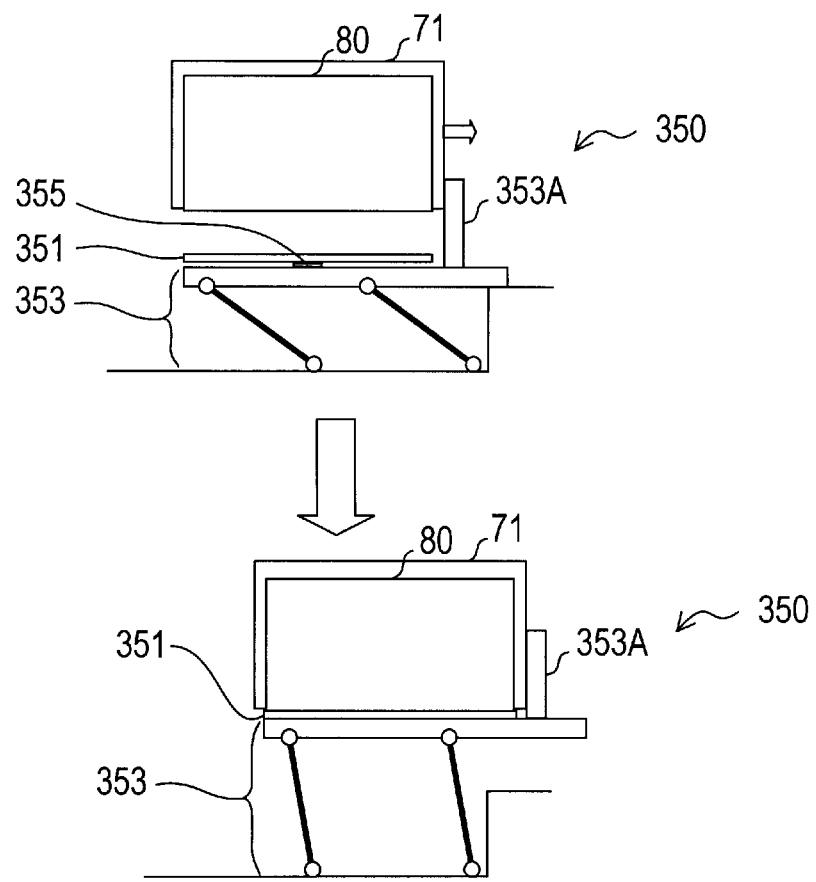

FIG. 4 is a side view schematically showing a configuration of a capping mechanism in the image printing apparatus according to the illustrative embodiments of the present disclosure.

Figure 5:
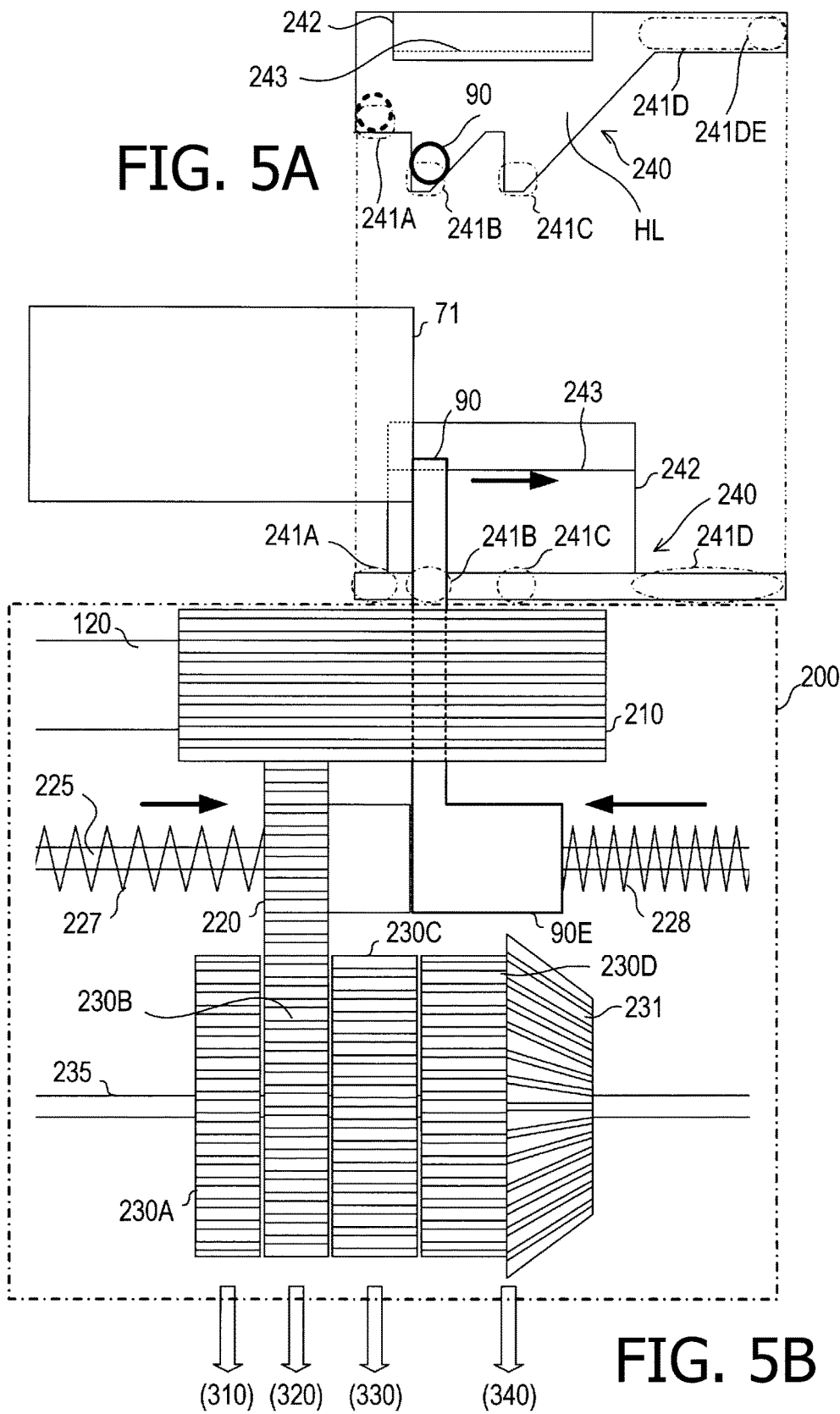

FIG. 5A is a plane view schematically showing a configuration of a lever holder in the image printing apparatus according to the illustrative embodiments of the present disclosure. FIG. 5B is a side view schematically showing a configuration of a power transmitter in the image printing apparatus according to the illustrative embodiments of the present disclosure.

Figure 6:
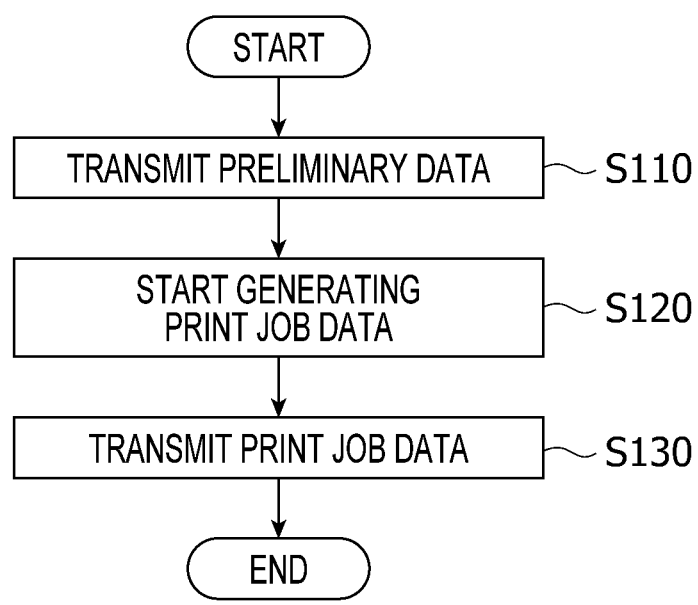

FIG. 6 is a flowchart showing a flow of steps in a process to be executed by a controller in an information processing apparatus according to the illustrative embodiments of the present disclosure.

Figure 7:
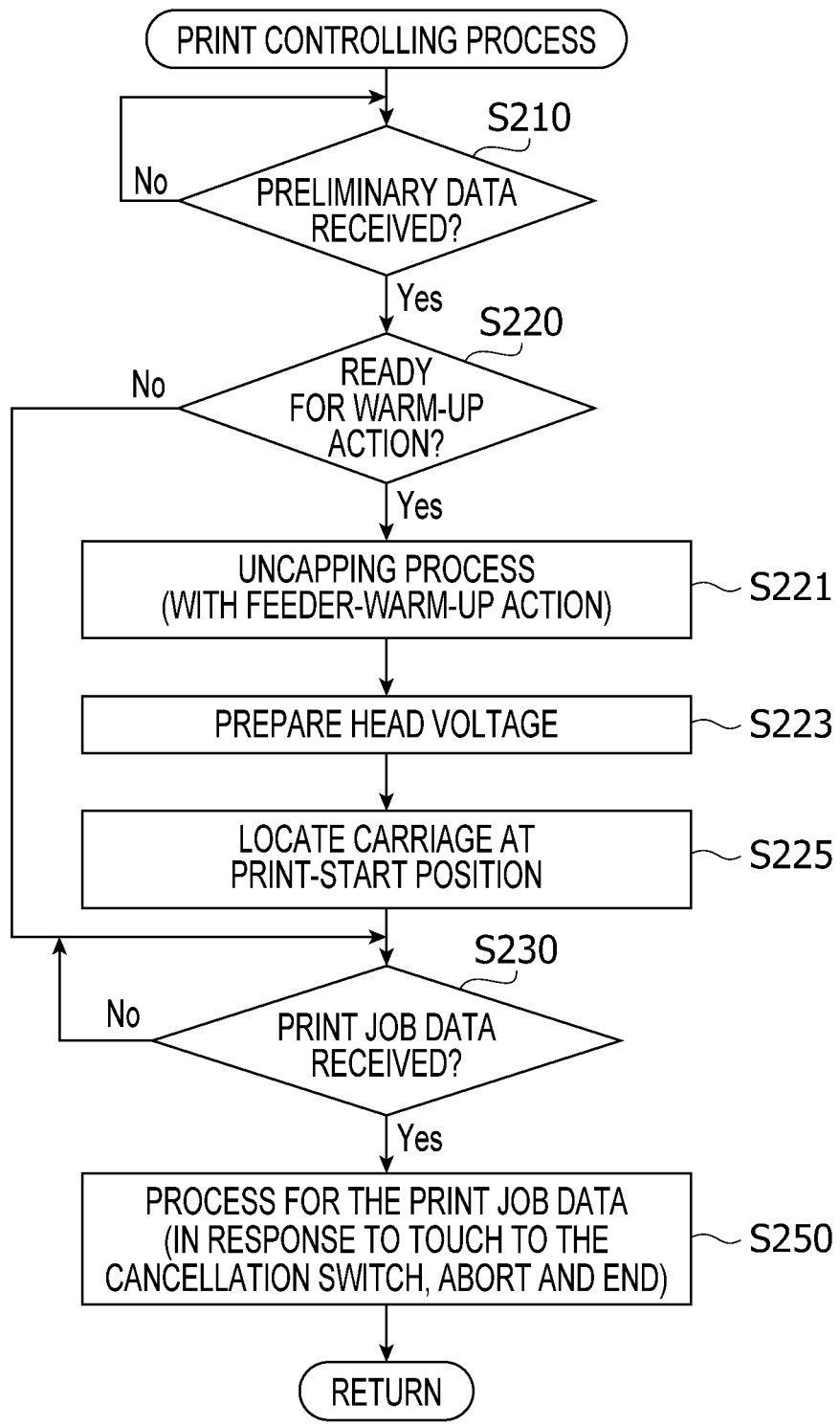

FIG. 7 is a flowchart showing a flow of steps in a print controlling process to be executed by a main controller in the image printing apparatus according to the illustrative embodiments of the present disclosure.

Figure 8:
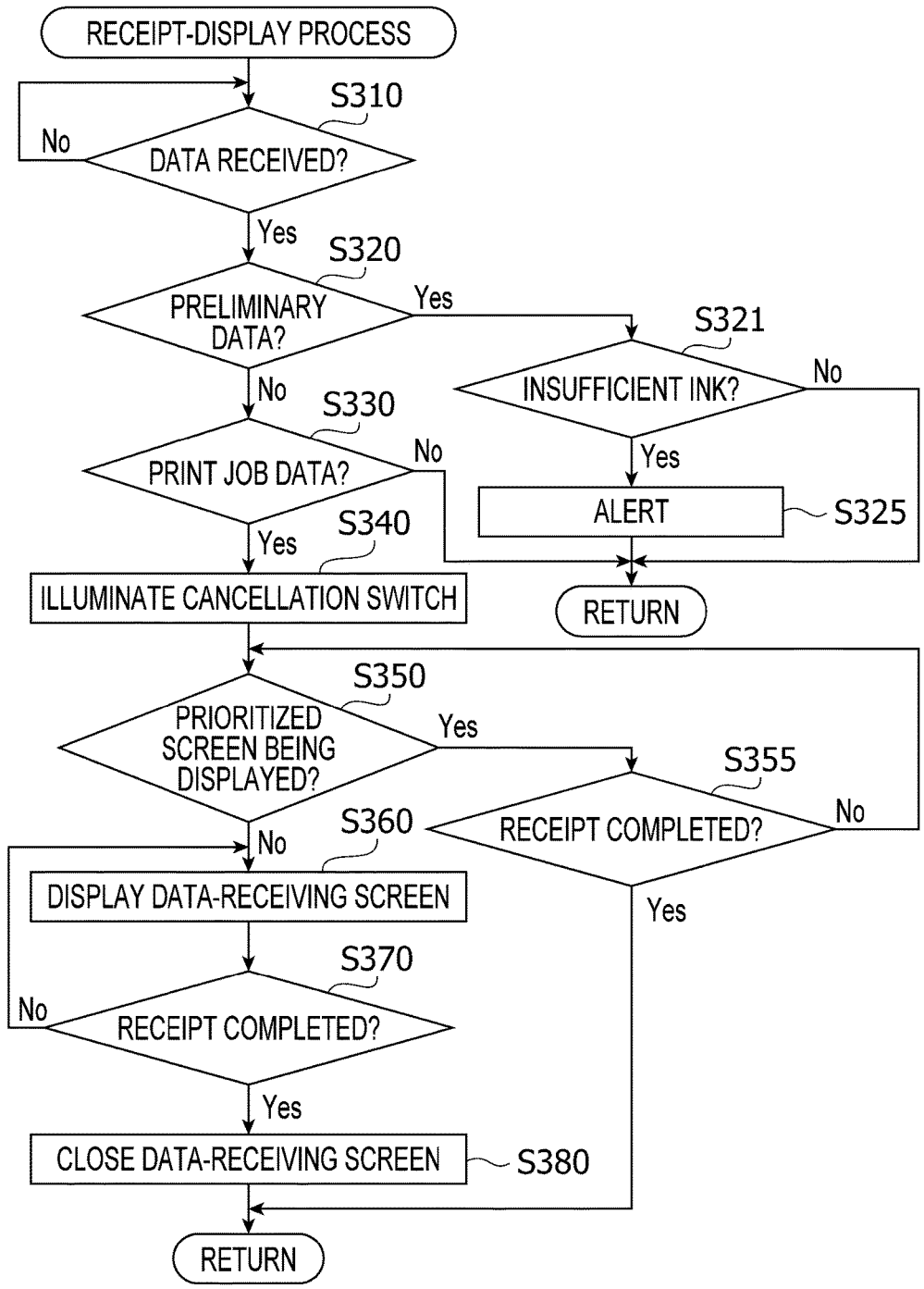

FIG. 8 is a flowchart showing a flow of steps in a receipt-display process to be executed by the main controller in the image printing apparatus according to the first illustrative embodiment of the present disclosure.

Figure 9:
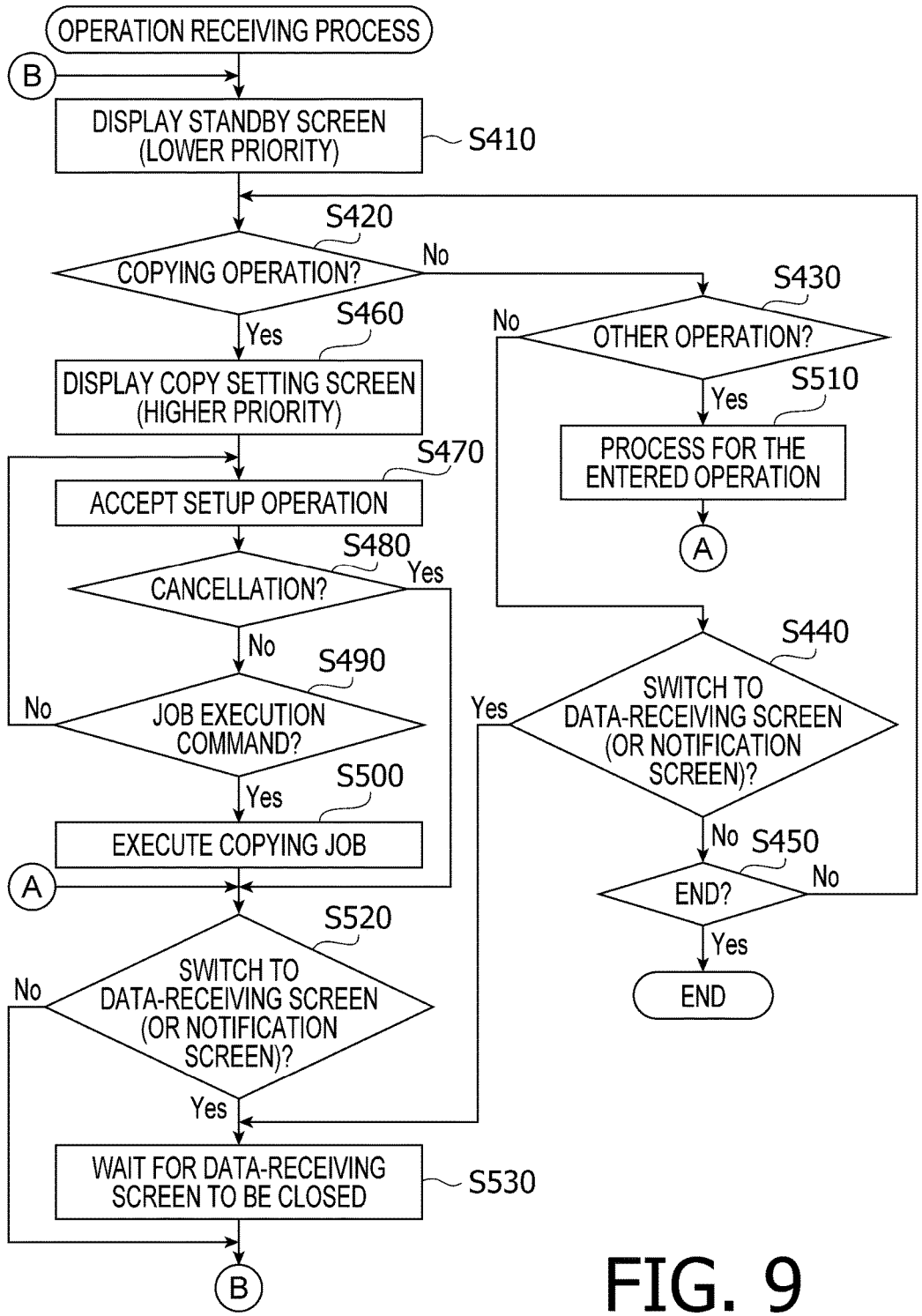

FIG. 9 is a flowchart showing a flow of steps in an operation accepting process to be executed by the main controller in the image printing apparatus according to the illustrative embodiments of the present disclosure.

Figure 10:
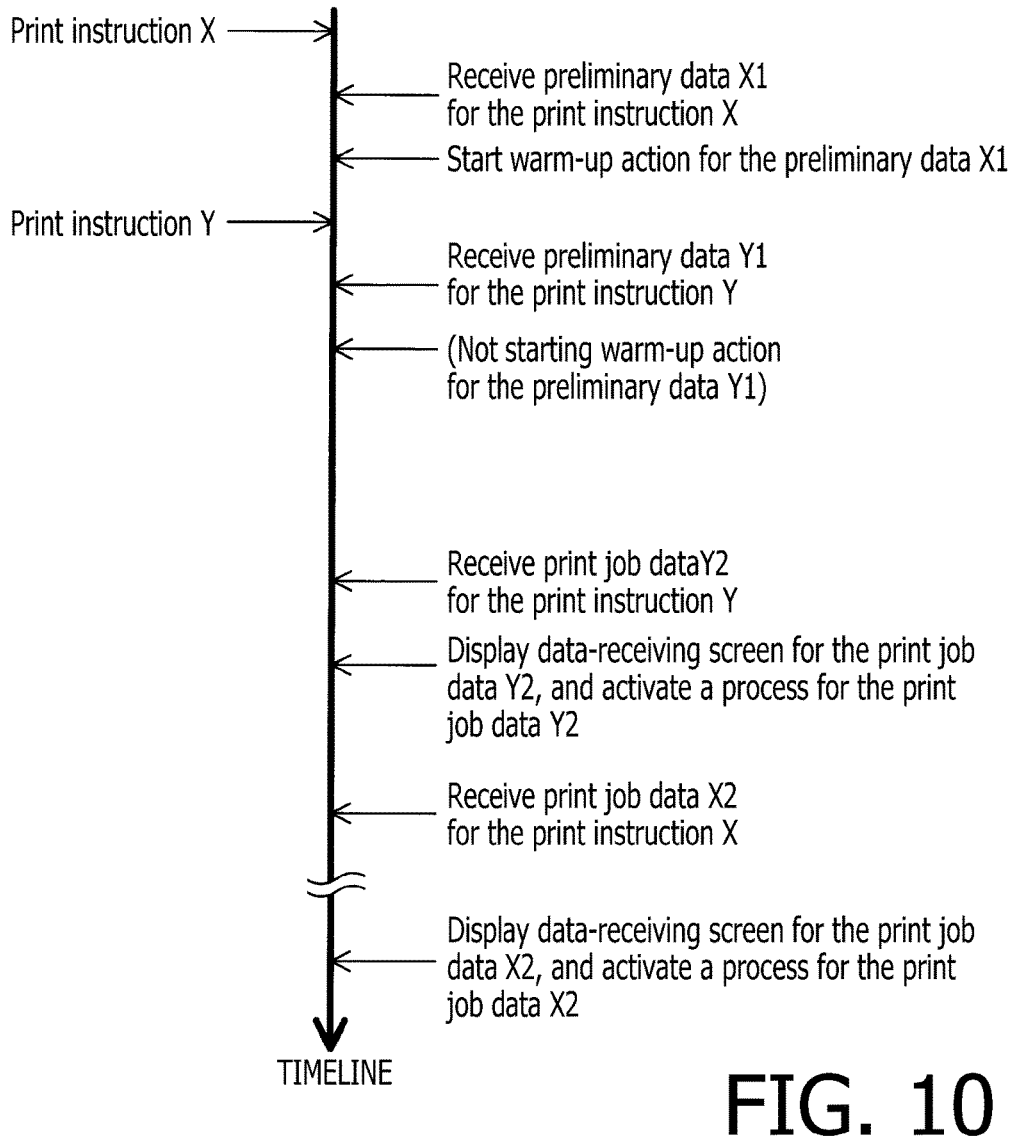

FIG. 10 is a time chart showing an order to receive and conduct print jobs and display data-receiving screens in the image printing apparatus according to the illustrative embodiments of the present disclosure.

Figure 11:
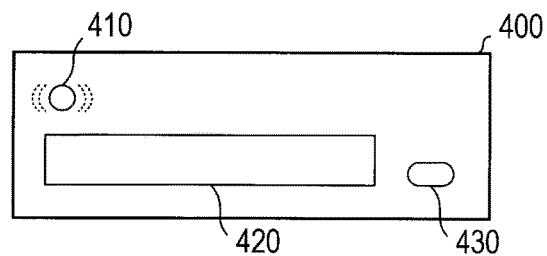

FIG. 11 is another illustrative view of a user interface in the image printing apparatus according to the first illustrative embodiment of the present disclosure.

Figure 12:
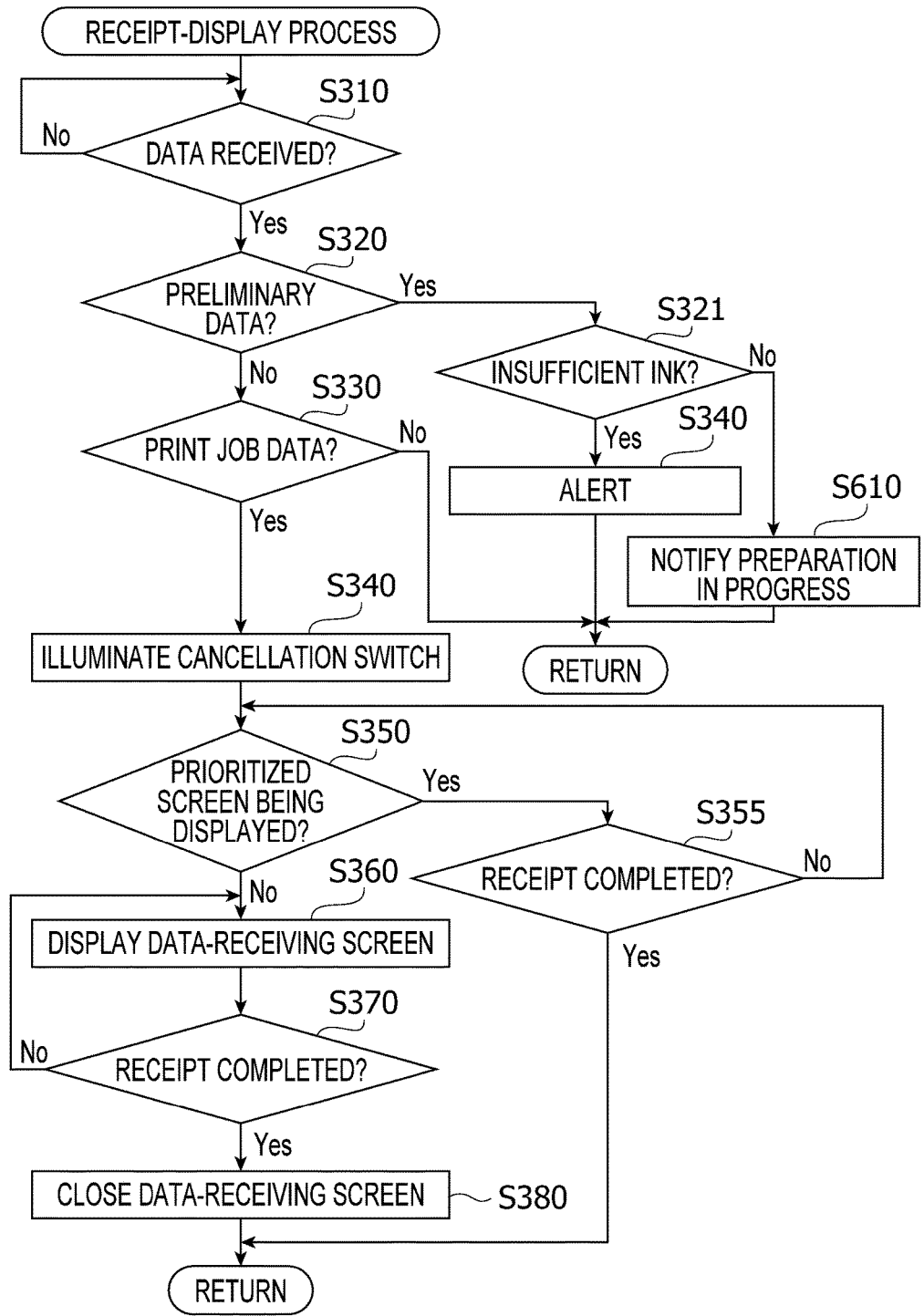

FIG. 12 is a flowchart showing a flow of steps in an operation accepting process to be executed by the main controller in the image printing apparatus according to second and third illustrative embodiments of the present disclosure.

Figure 13:
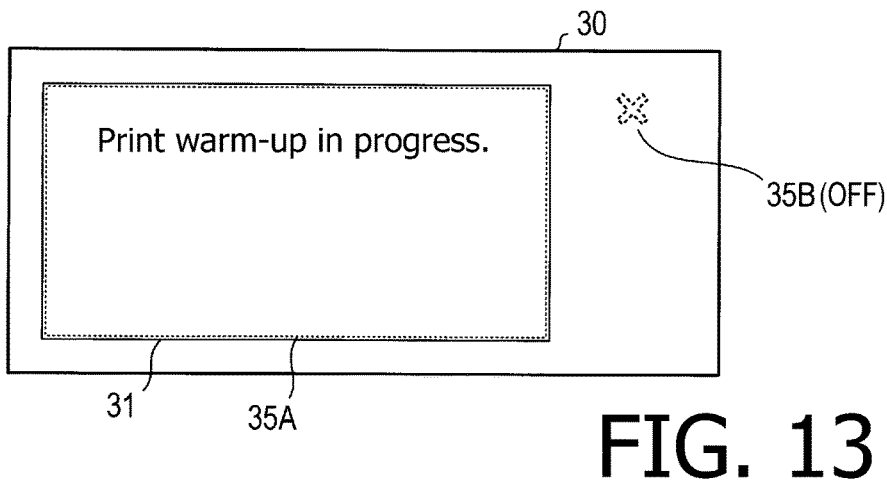

FIG. 13 is an illustrative view of a notification screen to be displayed in the image printing apparatus according to the second illustrative embodiment of the present disclosure.

Figure 14:
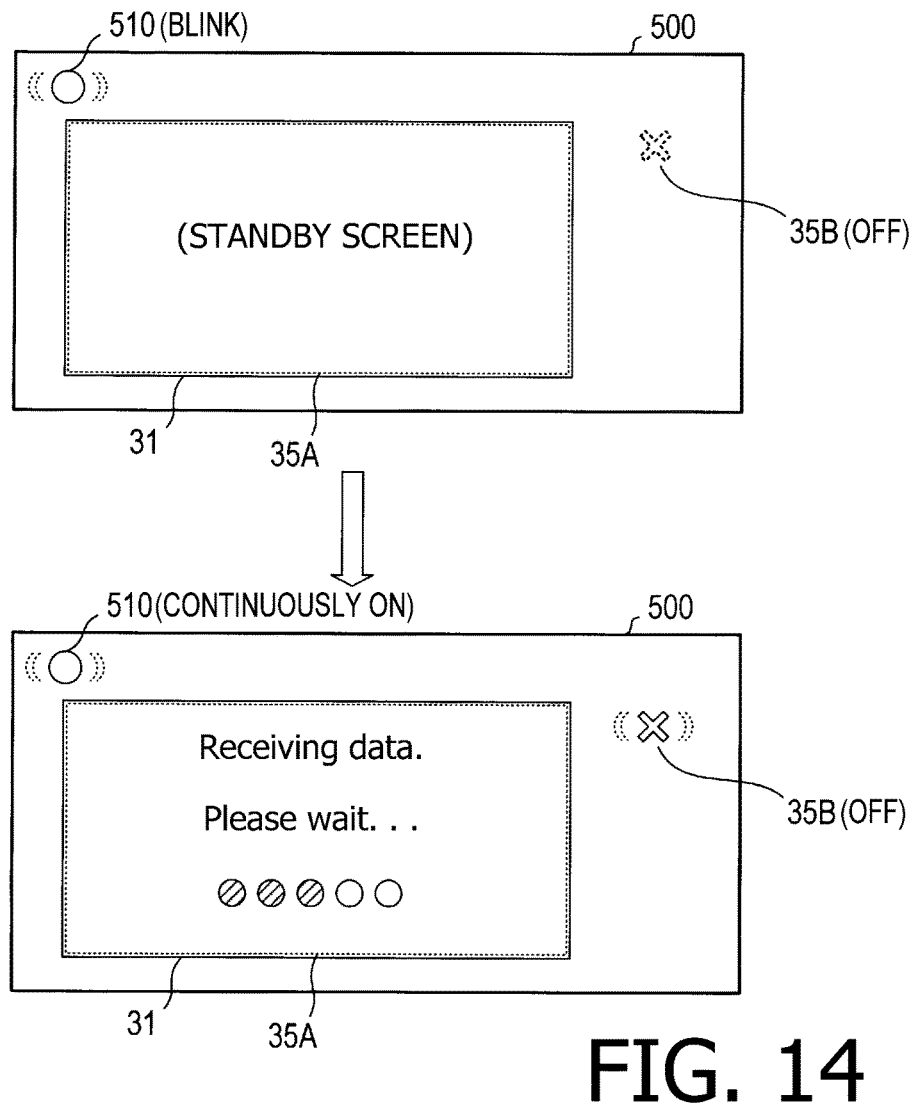

FIG. 14 is an illustrative view of a user interface in the image printing apparatus according to the third illustrative embodiment of the present disclosure.

DETAILED DESCRIPTION

Hereinafter, illustrative embodiments according to aspects of the present disclosure will be described with reference to the accompanying drawings.

It is noted that various connections may be set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to random access memories (RAMs), read-only memories (ROMs), flash memories, electrically erasable programmable ROMs (EEPROMs), CD-media, DVD-media, temporary storage, hard disk drives, floppy drives, permanent storage, and the like.

First Embodiment

Figure 1:
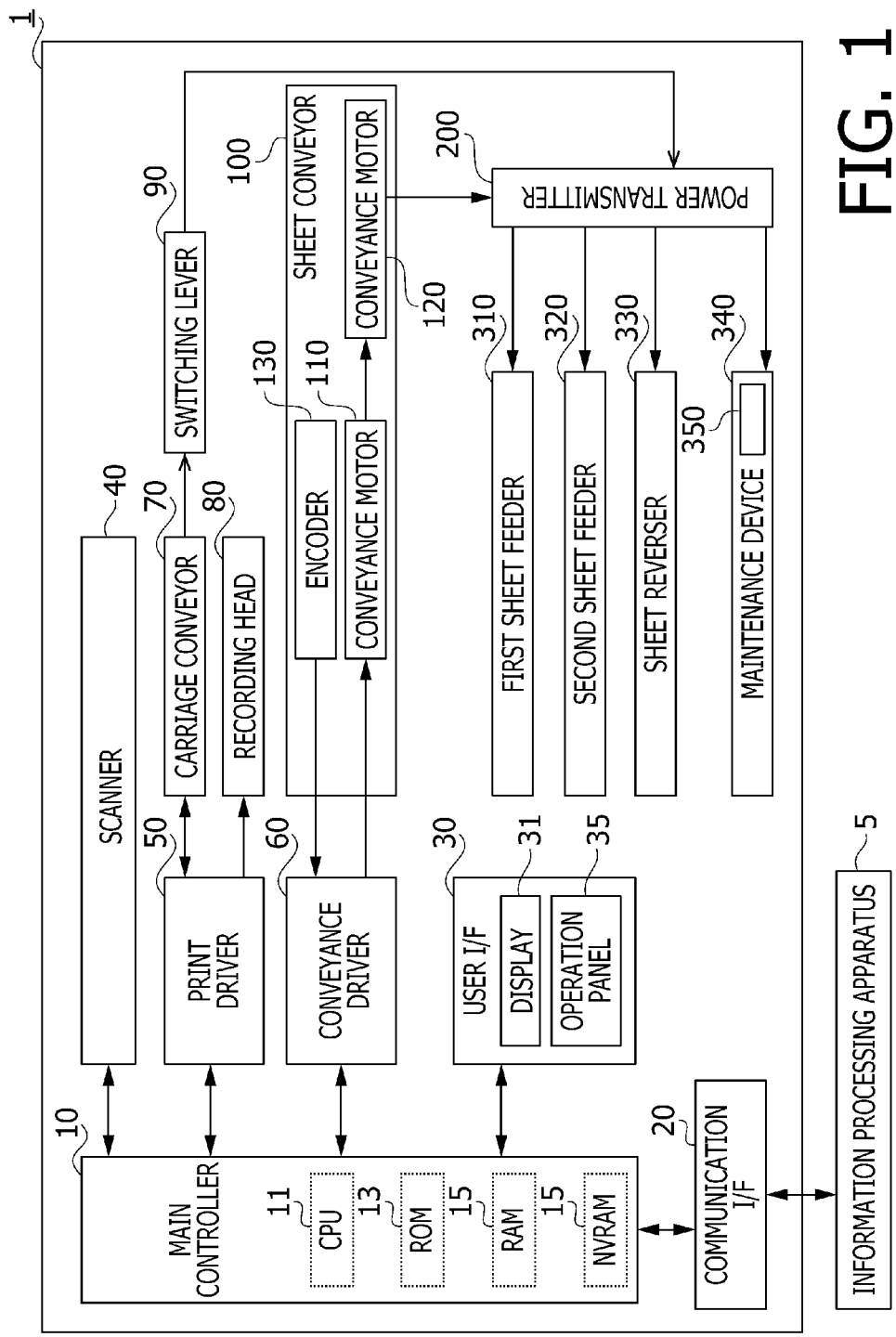
FIG. 1 is a block diagram schematically showing a configuration of an image printing apparatus according to illustrative embodiments of the present disclosure.

In a first embodiment, an image printing apparatus 1 shown in FIG. 1 has a plurality of functions including a printing function, to form an image on a sheet, and a copying function, to read an image of an original sheet and form a copied image of the read image. In other words, the image printing apparatus 1 includes a printer and a copier. The image printing apparatus 1 includes a main controller 10, a communication interface (I/F) 20, a user interface (I/F) 30, a scanner 40, a print driver 50, and a conveyance driver 60.

The image printing apparatus 1 further includes carriage conveyor 70, a recording head 80, a switching lever 90, a sheet conveyor 100, a power transmitter 200, a first sheet feeder 310, a second sheet feeder 320, a sheet reverser 330, and a maintenance device 340.

The main controller 10 includes a central processing unit (CPU) 11, a ROM 13, a RAM 15, and a non-volatile RAM (NVRAM) 17. The ROM 13 is configured to store various programs. The NVRAM 17 is an electrically-rewritable non-volatile memory configured to store data and programs that need to be saved even after the image printing apparatus 1 is powered off. The CPU 11 is configured to execute processes in accordance with the programs stored in the ROM 13 and the NVRAM 17. The RAM 15 may be used as a work area during execution of the processes by the CPU 11.

The CPU 11 takes overall control of individual elements included in the image printing apparatus 1 by executing the processes in accordance with the programs stored in the ROM 13 and the NVRAM 17. Thereby, the CPU 11 may achieve various functions. Hereinafter, the processes and operations undertaken by the CPU 11 may be described as processes and operations to be executed by the main controller 10. The processes and operations to be executed by the main controller 10 may include a print controlling process (FIG. 7), a receipt-display process (FIG. 8), and an operation accepting process (see FIG. 9), which will be described below.

The communication interface 20 may exchange data with an information processing apparatus 5 through, for example, universal serial bus (USB) and/or Bluetooth (trademark registered) communication. The communication interface 20 may perform data communication with the information processing apparatus 5 via a wired or wireless LAN.

Figure 2:
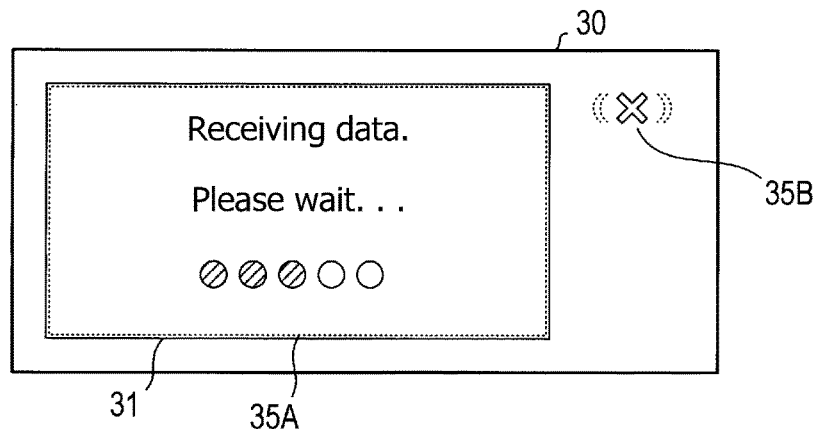
FIG. 2 is an illustrative view of a user interface of the image printing apparatus according to the illustrative embodiments of the present disclosure.

The user interface 30 is an assembly of devices including a display 31 and an operation panel 35. The display 31 may display information, which is to be notified by a user. For example, the display 31 may be a liquid crystal display. The operation panel 35 is operable by the user and may accept the user's input to instruct operations. The operation panel 35 includes a touch panel 35A provided on a screen of the display 31 and a capacitance switch 35B provided independently from the touch panel 35A. The capacitance switch 35B may be arranged outside the screen of the display 31 and may be illuminative. The illumination of the capacitance switch 35A may be switched on or off by the main controller 10. The capacitance switch 35B may be a cancellation switch 35B, which is shown in FIG. 2; however, the capacitance switch 35B may not necessarily be limited to the cancellation switch 35B but may include other types of switches, which are not shown.

The scanner 40 may optically scan a document placed on a document table or a document fed by an automatic document feeder, in accordance with commands from the main controller 10. Scanned image data, which represents a scanned image of the document, may be transmitted to the main controller 10.

The print driver 50 may control conveyance of a carriage 71 (see FIG. 3) with the recording head 80 mounted thereon and control an operation of discharging ink droplets from the recording head 80 in accordance with commands from the main controller 10. The print driver 50 controls the carriage conveyor 70 and thereby controls movement of the carriage 71 along a main scanning direction. The main scanning direction is perpendicular to a sub scanning direction (i.e., a sheet conveyance direction) in which sheets Q are conveyed.

As shown in FIG. 3, the carriage conveyor 70 includes the carriage 71, a motor 73, a belt mechanism 75, guide rails 77 and 78, and a linear encoder 79. The motor 73 is controlled by the print driver 50.

The belt mechanism 75 includes a driving pulley 751, a driven pulley 753, and a belt 755 strained around the driving pulley 751 and the driven pulley 753. The driving pulley 751 and the driven pulley 753 are arranged along the main scanning direction. The carriage 71 is fixedly attached to the belt 755. In the belt mechanism 75, the driving pulley 751 rotates in response to receipt of a driving force from the motor 73. The belt 755 and the driven pulley 53 are driven to rotate in accordance with rotation of the driving pulley 751.

The guide rails 77 and 78 extend along the main scanning direction, and are spaced apart from each other in the sub scanning direction. A hole HL is formed in the guide rail 78. The switching lever 90 protrudes upward (i.e., to a position above a carriage conveyance path) from beneath the guide rail 78 through the hole HL. The switching lever 90 will be described later in detail.

The belt mechanism 75 is disposed on the guide rail 77. For instance, a projection (not shown) extending in the main scanning direction may be formed at each of the guide rails 77 and 78, so as to restrict the moving direction of the carriage 71 to the main scanning direction. Meanwhile, the carriage 71 may be placed on the guide rails 77 and 78 such that grooves formed at a lower surface of the carriage 71 engage with the projections. In this state, the carriage 71 may reciprocate along the main scanning direction on the guide rails 77 and 78 in conjunction with rotation of the belt 755. The recording head 80 may be carried along the main scanning direction with movement of the carriage 71.

The linear encoder 79 is provided to enable the print driver 50 to detect a position of the carriage 71 in the main scanning direction. Specifically, the linear encoder 79 includes an encoder scale 79A and an optical sensor 79B. The encoder scale 79A is fixedly attached to the guide rail 77. The optical sensor 79B is fixedly attached to the carriage 71. The linear encoder 79 detects, by the optical sensor 79B, a change of a relative position between the encoder scale 79A and the optical sensor 79B, and inputs a detection signal representing the change of the relative position into the print driver 50 as an encoder signal.

The print driver 50 detects the position of the carriage 71 in the main scanning direction based on the encoder signal from the linear encoder 79. The print driver 50 controls the position and the velocity of the carriage 71 in the main scanning direction, by controlling the motor 73 based on the detected position of the carriage 71. Further, the print driver 50 controls the operation of discharging ink droplets by the recording head 80 in accordance with movement of the carriage 71, so that the ink droplets should land on intended positions on a sheet Q.

The conveyance driver 60 (see FIG. 1) controls a conveyance motor 110 in accordance with instructions from the main controller 10. The sheet conveyor 100 includes the conveyance motor 110, a conveyance roller 120, and a rotary encoder 130. The conveyance motor 110 is linked with the conveyance roller 120. Thereby, the conveyance roller 120 is driven to rotate by the conveyance motor 110.

The conveyance roller 120 is disposed upstream of an ink discharge position where the recording head 80 discharges ink droplets in the sheet conveyance direction. The conveyance roller 120 is disposed to face a pinch roller (not shown). The sheet conveyor 120 conveys the sheet Q fed from upstream in the sub scanning direction by rotating the conveyance roller 120 in a state where the sheet Q is pinched between the conveyance roller 120 and the pinch roller.

The rotary encoder 130 is provided to enable the conveyance driver 60 to detect a rotational quantity and a rotational speed of the conveyance roller 120. Specifically, the rotary encoder 130 is configured to output an encoder signal according to rotation of the conveyance roller 120.

The conveyance driver 60 detects the rotational quantity and the rotational speed of the conveyance roller 120 based on the encoder signal from the rotary encoder 130, and controls the conveyance motor 110. Thus, the conveyance driver 60 controls the rotation of the conveyance roller 120 and thereby controls conveyance of the sheet Q.

The power transmitter 200 is disposed at a specific end portion of the conveyance roller 120 opposite from another end portion thereof, which is connected with the conveyance motor 110. The power transmitter 200 is configured to receive a driving force from the conveyance motor 110 via the conveyance roller 120 and transmit the driving force to one of driven objects, which include the first sheet feeder 310, the second sheet feeder 320, the sheet reverser 330, and the maintenance device 340, depending on a position of the switching lever 90.

The first sheet feeder 310 includes a first feed tray and a first feed roller, which are not shown. The first feed roller is rotated by the driving force transmitted from the conveyance motor 110 via the conveyance roller 120 and the power transmitter 200. The first feed roller being rotated may feed the sheet Q set in the first feed tray to the conveyance roller 120.

In the same manner as the first sheet feeder 310, the second sheet feeder 320 includes a second feed roller and a second tray, which are not shown. The second feed roller is rotated by the driving force transmitted from the conveyance motor 110 via the conveyance roller 120 and the power transmitter 200. The second sheet feeder being rotated may feed sheets Q set in the second tray to the conveyance roller 120.

The sheet reverser 330 is driven in a double-side printing mode. The sheet reverser 330 operates in response to receipt of the driving force from the conveyance motor 110 via the conveyance roller 120 and the power transmitter 200. The sheet reverser 330 is configured to reverse a sheet Q, which has passed downstream of a print position (e.g., the ink discharge position) of the recording head 80 in the sheet conveyance direction, upside down, and feed the sheet Q for the second time upstream of the print position in the sheet conveyance direction.

The maintenance device 340 is configured to perform maintaining acts for the recording head 80. The maintenance device 340 includes a capping mechanism 350 and a pump (not shown). The pump operates in response to receipt of the driving force from the conveyance motor 110 via the power transmitter 200.

The capping mechanism 350 is disposed in a maintenance area MA (see FIG. 3) on the carriage conveyance path. The maintenance area MA is positioned at an end portion of the carriage conveyance path in the main scanning direction. A middle portion of the carriage conveyance path in the main scanning direction is a main area, in which the recording head 80 reciprocates to perform image formation on the sheet Q. The maintenance area MA is arranged in adjacent to the main area.

As shown in FIG. 4, the capping mechanism 350 includes a cap 351 and an elevator 353. The cap 351 is configured to cover a nozzle surface of the recording head 80. In the nozzle surface, discharge ports for discharging ink droplets are arranged. The cap 351 is connected with the elevator 353 via a spring 355. An upper part of FIG. 4 schematically shows a positional relationship between the cap 351 and the elevator 353 before the cap 351 is attached to cover the recording head 80. A lower part of FIG. 3 schematically shows a positional relationship between the cap 351 and the elevator 353 after the cap 351 is attached to cover the recording head 80.

The elevator 353 has a wall 353A configured to contact the carriage 71. The elevator 353 operates in response to receipt of a force from the carriage 71. Specifically, in response to the carriage 71 entering the maintenance area MA from the main area and moving to a terminal end of the carriage conveyance path, the elevator 353 gradually uplifts the cap 351 in response to receipt of the force from the carriage 71 via the wall 353A, and attaches the cap 351 onto the nozzle surface of the recording head 80. The attachment of the cap 351 is completed in response to the carriage 71 reaching the terminal end of the carriage conveyance path.

In response to the carriage 71 leaving the terminal end of the carriage conveyance path and moving toward the main area, the elevator 353 is released from a state where the elevator 353 is receiving the force from the carriage 71 via the wall 353A, and lowers the cap 351 due to the effect of gravity by its own weight. In response to the cap 351 being lowered, the cap 351 is detached from the recording head 80.

Thus, the capping mechanism 350 mechanically operates in response to receipt of the force from the carriage 71, and detachably attaches the cap 351 onto the recording head 80. The pump operates in response to receipt of the driving force from the conveyance motor 110 in a state where the cap 351 is attached on the recording head 80, and the pump sucks and retrieves ink droplets discharged to the cap 351 from the recording head 80.

Subsequently, the power transmitter 200 will be described in detail. As shown in FIG. 5B, the power transmitter 200 includes a driving gear 210, a movable gear 220, and connection gears 230A, 230B, 230C, and 230D. The connection gears 230A, 230B, 230C, and 230D correspond to the first sheet feeder 310, the second sheet feeder 320, the sheet reverser 330, and the maintenance unit 340, respectively. The driving gear 210, the movable gear 220, and the connection gears 230A, 230B, 230C, and 230D are formed as spur gears. Hereinafter, a written expression "the connection gears 230A-D" will be used to represent the connection gears 230A, 230B, 230C, and 230D. Further, a written expression "the connection gear 230" will be used to represent an unspecified one of the connection gears 230A, 230B, 230C, and 230D.

The driving gear 210 is fixedly attached to an end portion of the conveyance roller 120 such that a rotational axis of the driving gear 210 is positionally coincident with a rotational axis of the conveyance roller 120. Thereby, the driving gear 210 rotates integrally with the conveyance roller 120. The driving gear 210 has such a dimension in an axial direction thereof as to always engage with the movable gear 220 within a movable range of the movable gear 220.

The movable gear 220 is disposed to always engage with the driving gear 210 and have a rotational axis parallel to the rotational axis of the driving gear 210. Along the rotational axis of the movable gear 220, a shaft 225 is inserted through a hole formed at a rotational center of the movable gear 220. Thereby, the movable gear 220 is disposed to be rotatable relatively to the shaft 225 and slidable in its axial direction.

The movable gear 220 is configured to be guided by the shaft 225 and move between the connection gears 230A and 230D. The connection gears 230A-D are arranged along the rotational axis (i.e., along the shaft 225) of the movable gear 220 such that their adjoining side surfaces perpendicular to a rotational axis of the connection gears 230A-D face each other in a rotational axis direction of the connection gears 230A-D. The movable gear 220 has such a dimension in its axial direction as to individually engage with each of the connection gears 230A-D.

The shaft 225 supports the switching lever 90 such that an end portion 90E of the switching lever 90 is movable in a sliding manner. The end portion 90E of the switching lever 90 is disposed closer than the movable gear 220 to the terminal end of the carriage conveyance path, so as to adjoin the movable gear 220.

Two (2) springs 227 and 228 are attached to the shaft 225 and disposed to flank the movable gear 220 and the end portion 90E of the switching lever 90. An urging force of the spring 228 is larger than an urging force of the spring 227. Accordingly, the switching lever 90 receives an urging force in a direction toward the connection gear 230A from the connection gear 230D, throughout a movable range of the switching lever 90. The movable gear 220 receives the urging force from the spring 227; therefore, in response to the switching lever 90 moving from the connection gear 230A to the connection gear 230D, the movable gear 220 moves to follow the switching lever 90. Thus, the movable gear 220 moves in accordance with the position (the movement) of the switching lever 90 by the action of the force from the spring 227.

As shown in FIG. 5A, the switching lever 90 is disposed in a lever holder 240, which forms the aforementioned hole HL. In FIG. 3, the hole HL is illustrated in an abstracted rectangular shape. However, more specifically, the hole HL may be formed in a shape shown in FIG. 5A. FIG. 5A shows an exemplary shape of the hole HL when viewed from above the guide rail 78. The lever holder 240 is fixedly attached to a hole formed in the guide rail 78.

The lever holder 240 has lever positioning areas 241A, 241B, 241C, and 241D. When contacting an edge of the hole HL in the lever positioning area 241A, the switching lever 90 is held to be restricted from moving to the main area of the carriage conveyance path even by the action of the forces from the springs 227 and 228. While the switching lever 90 is in the lever positioning area 241A, the movable gear 220 is placed in a position to engage with the connection gear 230A.

In response to the carriage 71 entering the maintenance area MA from the main area and moving toward the terminal end of the carriage conveyance path, the switching lever 90 comes into contact with the carriage 71 and receives a pressing force from the carriage 71. Thereby, the switching lever 90 moves from the lever positioning area 241A to the lever positioning area 241D. In response to the carriage 71 moving toward the main area of the carriage conveyance path, the switching lever 90 is released from the pressing force from the carriage 71, and moves from the lever positioning area 241D to the lever positioning area 241A by the action of the force from the spring 228.

In a state where the end portion 90E of the switching lever 90 is in contact with the movable gear 220, and when the switching lever 90 is in the lever positioning area 241B, the movable gear 220 is placed in a position to engage with the connection gear 230B. Likewise, when the switching lever 90 is in the lever positioning area 241C, the movable gear 220 is placed in a position to engage with the connection gear 230C. Moreover, when the switching lever 90 is in the lever positioning area 241D, the movable gear 220 is placed in a position to engage with the connection gear 230D.

The switching lever 90 receives, at the end portion 90E thereof, a torsional force (i.e., a force in a circumferential direction of the shaft 225) from the spring 228. More specifically, the switching lever 90 receives a force directed toward a lower left side in FIG. 5A.

Accordingly, in a process of moving from the lever positioning area 241A to the lever positioning area 241D, the switching lever 90 moves along lower edges of the hole HL in FIG. 5A. While the carriage 71 may move backward to the main area, the switching lever 90 is held in the lever positioning area 241B or 241C by notches formed in the lever positioning areas 241B and 241C.

After the switching lever 90 is placed in the lever positioning area 241D, in response to the carriage 71 beginning to move backward, the switching lever 90 moves back to the lever positioning area 241A while being guided by a guide member 242, by the action of the force from the spring 228. The guide member 242 includes a rail 243 formed to extend downward. The switching lever 90 moves back to the lever positioning area 241A while sliding in contact with the rail 243. At this time, the movable gear 220 moves to the connection gear 230A along with the switching lever 90, in response to receipt of the force from the end portion 90E of the switching lever 90.

The connection gears 230A-D are rotatably supported by a common shaft 235, which is parallel to the rotational axis of the movable gear 220. A rotational axis of the connection gears 230A-D is positionally coincident with the shaft 235. The connection gears 230A-D are disposed within the movable range of the movable gear 220 in their rotational axis direction.

The connection gear 230A is connected with the first sheet feeder 310. Specifically, in a state where the connection gear 230A engages with the movable gear 220, the connection gear 230A receives the driving force from the conveyance roller 120 via the driving gear 210 and the movable gear 220, and transmits the driving force to the first sheet feeder 310. Thereby, the first sheet feeder 310 is driven.

The connection gear 230B is connected with the second sheet feeder 320. Specifically, in a state where the connection gear 230B engages with the movable gear 220, the connection gear 230B receives the driving force from the conveyance roller 120 via the driving gear 210 and the movable gear 220, and transmits the driving force to the second sheet feeder 320. Thereby, the second sheet feeder 320 is driven.

The connection gear 230C is connected with the sheet reverser 330. Specifically, in a state where the connection gear 230C engages with the movable gear 220, the connection gear 230C receives the driving force from the conveyance roller 120 via the driving gear 210 and the movable gear 220, and transmits the driving force to the sheet reverser 330. Thereby, the sheet reverser 330 is driven.

The connection gear 230D includes a bevel gear 231, which is connected with the maintenance unit 340. In a state where the connection gear 230D engages with the movable gear 220, the connection gear 230D receives the driving force from the conveyance roller 120 via the driving gear 210 and the movable gear 220, and transmits the driving force to the maintenance unit 340. Thereby, the maintenance unit 340 (more specifically, the pump) is driven.

In response to the switching lever 90 moving, in the lever positioning area 241D, toward the terminal end of the carriage conveyance path, the movable gear 220 is urged by the spring 227, but is prevented from moving toward the terminal end, by the bevel gear 231 of the connection gear 230D. Thereby, the movable gear 220 is maintained connected with the connection gear 230D.

In response to the switching lever 90 moving, in the lever positioning area 241D, toward the terminal end of the carriage conveyance path, the capping mechanism 350 uplifts the cap 351 in conjunction with movement of the carriage 71. In response to the switching lever 90 reaching an end 241DE of the lever positioning area 241D, the operation of capping the recording head 80 is completed.

The terminal end of the carriage conveyance path, where the operation of capping the recording head 80 is completed when the carriage 71 reaches thereat, corresponds to a home position of the carriage 71. The image printing apparatus 1 maintains a state where the carriage 71 is in the home position, during a period of time in which it is unnecessary to perform image formation on a sheet Q. At this time, the switching lever 90 is maintained placed in the end 241DE. Further, at this time, a power transmission path is interrupted between the conveyance motor 110 and each of the first sheet feeder 310, the second sheet feeder 320, and the sheet reverser 330. In other words, at this time, the first sheet feeder 310, the second sheet feeder 320, and the sheet reverser 330 are disconnected from the conveyance motor 110.

In response to the carriage 71 entering the main area from the home position, the switching lever 90 positioned in the lever positioning area 241D moves back to the lever positioning area 241A while being guided by the guide member 242. Along with the movement of the switching lever 90, while the end portion 90E of the switching lever 90 is in contact with the movable gear 220, the movable gear 200 moves from the position to engage with the connection gear 230D to the position to engage with the connection gear 230A. The lever positioning area 241A is the first area where the switching lever 90 is placed after returning from the lever positioning area 241D.

In response to receipt of a unit of print job data transmitted from the image processing apparatus 5, the main controller 10 controls the elements described above to form an image on the sheet Q based on print data, which is included in the unit of print job data. Specifically, the main controller 10 controls a conveyance action of the carriage 71, a discharging action to discharge ink droplets from the recording head 80, sheet feeding actions with the first and second sheet feeders 310, 302, and a conveyance action to convey the sheets Q with the sheet conveyor 100 by issuing commands to the print driver 50 and the conveyance driver 60. Controls of these actions will be described later in detail.

The information processing apparatus 5 is a known personal computer, in which a printer driver for the image printing apparatus 1 is installed. The information processing apparatus 5 may execute a process shown in FIG. 6 based on the printer driver in response to a print instruction input through an application program by the user.

In response to the input of the print instruction, in S110, the information processing apparatus 5 transmits preliminary data to the image printing apparatus 1 designated by the user. The preliminary data is a data unit, which includes notification to the image printing apparatus 1 that print job data containing print data is to be transmitted from the information processing apparatus 5, and command the image printing apparatus 1 to warm up for a print job.

Following S110, in S120, the information processing apparatus 5 starts generating a unit of print job data. Specifically, in S120, the information processing apparatus 5 converts print-objective data designated by the user into printable data, which is formatted for printing an image on the sheet Q. The printable data, which will be herein referred to as "print data," may be, for example, imaging data describing an image of a printing object in page-descriptive language. When generating the print job data including the print data, the information processing apparatus 5 appends print setting data concerning print conditions for the print job on a front side of the print data. The print setting data is setup information for the print job and may include, for example, information of a size and a type of the sheet Q to be used in the print job.

In S130, the information processing apparatus 5 transmits the print job data, including the print setting data and the print data, to the image printing apparatus 1. When transmitting the print data in the print job data, the information processing apparatus 5 may transmit the print data piece by piece chronologically as the conversion progresses before entire print data is completely converted. A piece of print data is a data unit to form a line of image on the sheet Q in a single one-way travel of the carriage 71 in the main scanning direction. In the following description, the piece of print data for the line may be referred to as "print data for a path unit" or "a unit of print data for a path." The process in the information processing apparatus 5 ends after S130.

Meanwhile, the main controller 10 of the image printing apparatus 1 receives the print data unit-by-unit sequentially from the information processing apparatus 5 being the sender of the preliminary data and the print job data through the communication interface 20.

Next, the print controlling process to be executed by the main controller 10 of the image printing apparatus 1 will be described with reference to FIG. 7. The main controller 10 may execute the print controlling process shown in FIG. 7 repetitively. As the print controlling process starts, in S210, the main controller 10 waits until preliminary data transmitted from the information processing apparatus 5 for a current print job is newly received (S210: NO). In response to receipt of the preliminary data (S210: YES), the main controller 10 proceeds to S220 and onward.

In S220, the main controller 10 determines whether the main controller 10 is ready to perform a warm-up action concerning printing. The main controller 10 may determine that the main controller 10 is not ready (S220: NO) under one of the following conditions: where a warm-up action for preliminary data, which is related to a previous print job, received earlier than the preliminary data for the current print job is in progress; where it is a transitive state between completion of the warm-up action for the earlier preliminary data and execution of the previous print job; and where the previous print job is in progress. Under the other condition than the above, the main controller 10 may make affirmative determination (S220: YES). Executing a print job by the main controller 10 may mean conducting processes for the print job data, which will be described below, by the main controller 10. The print job to be executed by the main controller 10 may include a print job based on the print data unit from the information processing apparatus 5 and a copier job, which may not necessarily be based on the print data from the information processing apparatus 5.

Based on affirmative determination that the main controller 10 is ready for the current warm-up action (S220: YES), the main controller 10 proceeds to S221. Based on negative determination that the main controller 10 is not ready for the current warm-up action (S220: NO), the main controller 10 proceeds to S230.

In S221, the main controller 10 executes an uncapping process. The uncapping process is a process to remove the cap 351 from the recording head 80. In the uncapping process, the main controller 10 controls the carriage 71 to move from the terminal end (i.e., the home position) of the maintenance area MA to the main area. Thereby, the switching lever 90 is moved from the lever positioning area 241D to the lever positioning area 241A.

Hereinafter, the lever positioning area 241A, the lever positioning area 241B, the lever positioning area 241C, and the lever positioning area 241D may be referred to as a "position A," a "position B," a "position C," and a "position D," respectively.

In response to the carriage 71 being moved toward the main area in a state where the switching lever 90 is in the position D (e.g., the end 241DE), the switching lever 90 moves to the position A while being guided by the guide member 242, without being locked by any of the notches of the lever holder 240 that are formed in the positions B and C. Along with the movement of the switching lever 90, the movable gear 220 moves to the position to engage with the connection gear 230A.

In the uncapping process, further, the main controller 10 moves the switching lever 90 to the position A while performing a control operation to finely rotate the movable gear 220 alternately in a forward rotational direction and a backward rotational direction via the driving gear 210. The fine rotation is achieved by controlling rotation of the conveyance motor 110 via the conveyance driver 60. By repeating the alternate fine rotation of the movable gear 220, a moment comes at which the teeth of the movable gear 220 align with the tooth grooves of a connection gear 230 in the moving direction of the movable gear 220. Thus, the movable gear 220 moves to the connection gear 230A. Hereinafter, the operation of finely rotating the driving gear 210 and the movable gear 220 alternately in the forward rotational direction and the backward rotational direction may be referred to as a "forward-backward rotating operation."

In the present embodiment, when moving the movable gear 220 to a position to engage with an intended connection gear 230, the main controller 10 performs the forward-backward rotating operation along with controlling the position of the switching lever 90. Nonetheless, in a system configured to achieve engagement between gears without having to perform a forward-backward rotating operation, there may be no need to perform the forward-backward rotating operation.

In S221, further, the main controller 10 performs a feeder-warm-up action to warm up for driving the first sheet feeder 310. Following S221, in S223, the main controller 10 performs a head-warm-up action to warm up for driving the recording head 80 by activating a driving voltage to the recording head 80.

Further, in S225, the main controller 10 issues a command to the print driver 50 and controls the carriage conveyor 70 to locate the carriage 71 in a print-start position in the main area. Thereby, in response to receipt of the print data contained in the print job data from the information processing apparatus 5, the main controller 10 may warm up for an image printing action so that the image printing action may be started promptly. The print-start position is a position upstream for a necessary entrance length, in a carriage conveyance direction, from a primary discharging position, at which the recording head 80 may discharge a first droplet within a travel of a single path.

The steps S221-S223 related to the warm-up action described above may be achieved by the input of the commands from the main controller 10 to the print driver 50 and the conveyance driver 60. In response to the input of the commands from the main controller 10, substantive controls related to the warm-up action may be taken over by the print driver 50 and the conveyance driver 60. Meanwhile, the main controller 10 may, without waiting for completion of the warm-up action, proceed to S230.

In S230, the main controller 10 waits for the print setting data and the print data for a first path unit which are contained in the print job data. In response to receipt of the print setting data and the print data for the first path unit, in S250, the main controller 10 executes a process for the print job data. In other words, the main controller 10 processes the print job. According to the present embodiment, the image printing apparatus 1 may print a line of image for an area corresponding to a single path unit on the sheet Q by conveying the carriage 71 for the single path. Therefore, the image printing apparatus 1 may start printing the image as soon as a sufficient amount of print data, i.e., the print data for the first path unit, is received. Meanwhile, for example, when the process for the currently received print job data is ready to be started, there may be another unit of print job data for a previous print job in progress, in other words, there may be a previous (first) print job being in process. In this situation, the main controller 10 may wait until completion of the ongoing process for the first print job before the main controller 10 substantively starts the process for the current (latest) print job. For another example, if another (second) unit of print job data following the first unit of print job data is in queue standing by to be processed, the main controller 10 may start the process for the latest print job data after completion of the process for the second print job data unit in queue.

Meanwhile, a transitive period, which is from the communication interface 20 receiving the preliminary data until the communication interface 20 starts receiving the print data for the first path unit for the current print job, may be too short, and the warm-up action may not be completed before the print data for the first path unit is completely received. In this situation, the main controller 10 may wait for the warm-up action to be completed and substantively start the process for the print job data after the completion of the warm-up action.

As the main controller 10 starts the process for the print job data, the main controller 10 may need to switch connections between the conveyance motor 110 and one of the first sheet feeder 310 and the second sheet feeder 320 so that the sheet Q may be fed from a correct one of the first and second sheet feeders 310, 320 in accordance with the print setup indicated in the print setting data. In this regard, as mentioned above, the connection may be switched by moving the switching lever 90. In order to reduce frequency of switching the connection, the first feeder tray, for example, in the first sheet feeder 310 may be designated as a default tray, and the user may be advised to set more-frequently-usable type of sheets Q in the first feeder tray through a user's operation manual.

As the process for the print job data starts, the main controller 10 inputs commands to the print driver 50 and the conveyance driver 60 to print an image on the sheet Q according to the print data for the first path unit and succeeding print data which is successively transmitted from the information processing apparatus 5 on the path unit basis. Thus, by the main controller 10 conducting the process for the print job data unit, the print-objective image is printed on the sheet Q according to the print data contained in the print job data.

Meanwhile, by the print driver 50 and the sheet conveyor 100 acting in accordance with the commands from the main controller 10, the first sheet feeder 310 or the second sheet feeder 320 may be driven by the conveyance motor 110 to feed the sheet Q to the conveyance roller 120 and onward. The conveyance roller 120 may convey the sheet Q having been conveyed from an upstream side to a downstream side in the sub scanning direction by rotating.

The carriage 71 is, after having been located at the print-start position, driven to reciprocate in the main scanning direction, and the recording head 80 is driven to discharge ink droplets at predetermined timings to form the image on the sheet Q. The conveyance roller 120 is driven in conjunction with the reciprocating behavior of the carriage 71 to convey the sheet Q for a predetermined amount for each travel of the carriage 71 travelling for a path.

Thus, within the series of these behaviors, in the similar manner as a known inkjet printer, the image based on the print data transmitted from the information processing apparatus 5 is printed on the sheet Q. However, the main controller 10 may abort the process for the print job data in response to a user's operation to touch the cancellation switch 35B after turning on the illumination of the cancellation switch 35B in S340, which will be described later. Further, the main controller 10 may turn off the illumination of the cancellation switch 35B when there is no succeeding print job after termination or abortion of the process for the print job data. Optionally, the main controller 10 may be configured to switch illumination of the cancellation switch 35B from on to off in response to completion of receiving the print job data.

The cancellation switch 35B is configured not accept the user's touching operation when the illumination of the cancellation switch 35B is off. In other words, the main controller 10 may accept the user's touching operation to the cancellation switch 35B and abort the process for the print job data, which is a process for the print job data currently being executed or a process in queue waiting for completion of a warm-up action, in S250 only after start receiving the print job data and turning the illumination of the cancellation switch 35B on. In other words, the main controller 10 withholds from accepting the user's cancelling operation to the print job data until the print job data is received through the communication interface 20. Therefore, even after the main controller 10 receives preliminary data transmitted prior to the print job data, the main controller 10 does not accept a cancellation operation to cancel the process for the print job data that follows the preliminary data until the main controller 10 receives the print job data. The main controller 10 thus executes and ends the print controlling process shown in FIG. 7.

Next, a flow of steps in a receipt-display process to be executed by the main controller 10 will be described with reference to FIG. 8. The main controller 10 executes the receipt-display process repetitively in parallel with the print controlling process. In response to activation of the receipt-display process, in S310, the main controller 10 waits for data transmitted from the information processing apparatus 5. In response to receipt of data from the information processing apparatus 5 (S310: YES), the main controller 10 proceeds to S320 and onward.

In S320, the main controller 10 determines whether the received data is preliminary data. Based on affirmative determination that the received data is preliminary data (S320: YES), in S321, the main controller 10 determines whether the ink to be supplied to the recording head 80 is insufficient. Based on affirmative determination that the ink is insufficient (S321: YES), in S325, the main controller 10 starts an alert process, in which the user is notified of the insufficient ink. Thereafter, the main controller 10 ends the current receipt-display process. In S321, based on negative determination that the ink is not insufficient (S321: NO), in other words, when the ink is sufficient, the main controller 10 ends the current receipt-display process without conducting the alert process.

The alert process may include a process, in which the main controller 10 controls the display 31 to display an alert message indicating the shortage of the ink. The alert message may be, for example, laid over a part of the screen being displayed on the display 31 and erased, or closed, after a predetermine length of time. The alert process may include a process, in which the main controller 10 erases the alert message from the screen in response to a touching operation by the user to the alert message on the touch panel 35A.

Further, the alert process may include a process, in which the main controller 10 controls the user interface 30 to produce alerting sound in conjunction with the alert message on the display 31. For another example, the alert process may include a process, in which the main controller 10 transmits an alert message to the information processing apparatus 5 being the sender of the preliminary data through the communication interface 20 and manipulates the information processing apparatus 5 to display the alert message.

In S320, based on negative determination that the received data is not preliminary data (S320: NO), in S330, the main controller 10 determines whether the received data is print job data including print setting data and print data. Based on negative determination that the received data is not print job data (S330: NO), the main controller 10 ends the current receipt-display process. In S330, based on affirmative determining that the received data is print job data (S330: YES), the main controller 10 proceeds to S340.

In S340, the main controller 10 illuminates the cancellation switch 35B, and in S350, determines whether a prioritized screen is being displayed on the display 31. A standby screen, which will be described later, is a lower-prioritized screen while a copier setting screen being in a lower layer than the standby screen is a prioritized screen. According to the present embodiment, a screen in a lower layer, which may be displayed in response to a user's operation to the standby screen is set to be a prioritized screen. Under a condition where the standby screen is manipulated, it may be assumed that the user stands in front of or in the vicinity of the image printing apparatus 1. Therefore, based on this assumption, the priority of the screens may be determined so that the screen desired by the user may be displayed dominantly.

In S350, based on affirmative determining that the prioritized screen is being displayed (S350: YES), in S355, the main controller 10 determines whether the print data for all of the path units contained in the unit of print job data is completely received.

Based on negative determination that the print data for all the path units are not completely received (S355: NO), the main controller 10 returns to S350 and waits until the prioritized screen is closed. On the other hand, based on affirmative determination that the print data for all of the path units is completely received (S355: YES), the main controller 10 ends the current receipt-display process.

Based on negative determination that any prioritized screen being displayed, or that the prioritized screen has been closed (S350: NO), in S360, the main controller 10 controls the display 31 to start displaying a data-receiving screen. The data-receiving screen may include, for example, as shown in FIG. 2, a screen indicating that the data is being received to the user. The data-receiving screen may be a prioritized screen.

The print data included in the print job data is, as described earlier, transmitted from the information processing apparatus 5 to the image printing apparatus 1 on the path unit basis. Therefore, unless a prioritized screen is being displayed by the time when the print data for the first path unit is received, the data-receiving screen may start being displayed in response to receipt of the print data for the first path unit. In other words, while a data-receiving screen for the previous print job data is being displayed, the main controller 10 makes affirmative determination in S350 and controls the display 31 to start displaying the data-receiving screen for the current print job data in response to closure of the previously displayed data-receiving screen.

The main controller 10 starts displaying the data-receiving screen in S360 and continues displaying until the unit of print job data is completely received (S370). In response to completion of receiving the unit of print job data (S370: YES), in S380, the main controller 10 controls the display 31 to terminate displaying the data-receiving screen to close the data-receiving screen. The main controller 10 ends the current receipt-display process. The determination by the main controller 10 in S370 may be made in the similar manner as the determination in S355.

Meanwhile, the main controller 10 is configured to execute an operation accepting process, shown in FIG. 9, in response to activation of the image printing apparatus 1 in parallel with the print controlling process and the receipt-display process. In response to activation of the operation accepting process shown in FIG. 9, in S410, the main controller 10 controls the display 31 to display the standby screen. The standby screen is a screen in a topmost layer among screens to be displayed in layer hierarchy. The standby screen may include an operable object, through which for example the user may input an instruction for displaying a copier setting screen, and one or more operable objects, through which the user may input instruction(s) for displaying other setting screen(s).

As the standby screen starts being displayed, the main controller 10 determines whether operations are input through the standby screen (S420, S430) and whether the standby screen being displayed on the display 31 is switched to the data-receiving screen (S440), and waits until an operation to power off the image printing apparatus 1 is entered (S450).

Specifically, in S420, in response to an operation through the standby screen to instruct displaying the copier setting screen (S420: YES), the main controller 10 proceeds to S460. In response to another operation through the standby screen (S430: YES), in S510, the main controller 10 executes a process corresponding to the operation and proceeds to S520. Meanwhile, in response to the standby screen having been displayed on the display 31 being switched to the data-receiving screen (S440: YES), the main controller 10 proceeds to S530. Further, in response to the operation to power off the image printing apparatus 1 (S450: YES), the main controller 10 ends the operation accepting process.

In S460, the main controller 10 controls the display 31 to switch screens from the standby screen to the copier setting screen. The copier setting screen may be a screen to be displayed on the touch panel 35A, through which the user may select and enter setting options for setting items in order to perform a copying action. The setting items may include, for example, copying magnification, a sheet size, and an imaging quality. The copier setting screen may accept an instruction from the user to execute a copier job through the touch panel 35A. Further, the copier setting screen may accept a cancellation operation from the user that instructs the display 31 to close the copier setting screen and display the standby screen.

In response to the display 31 displaying the copier setting screen in S460, in S470-S490, the main controller 10 accepts the user's operation to the copier setting screen until the cancellation operation or the instruction to execute the copier job is entered. In response to input of the cancellation operation (S480: YES), the main controller 10 proceeds to S520. Meanwhile, in S490, in response to input of the instruction for the copier job (S490: YES), the main controller 10 proceeds to S500.

In S500, the main controller 10 closes the copier setting screen and executes the copier job. At the time when the copier job is to start, if the print job to print the image on the sheet Q is in progress, the main unit 10 may wait until completion of the print job and start the copier job thereafter.

In the copier job, the main controller 10 controls the scanner 40 to perform a reading action to read an image of an original document. Through the reading action of the scanner 40, the scanner 40 optically reads the original document placed on the document table or the original document conveyed by the auto document feeder and generate scanned image data for the original document.

In the copier job, further, the main controller 10 inputs commands to the print driver 50 and the conveyance driver 60 so that a copied image according to the scanned image data should be printed on a designated type of sheet Q in a designated printing quality. The main controller 10 may control a conveyance action of the carriage 71, an ink discharging action of the recording head 80, positions of the switching lever 90, driving and feeding actions of the first sheet feed unit 310 or the second sheet feed unit 320, and a conveyance action of the sheet conveyor 100 to convey the sheet Q.

While the copier job is in progress, the main controller 10 may display a screen, which shows a progress status of the copier job, on the display 31. The screen may be displayed on the display 31 as a prioritized screen, which is prioritized over the data-receiving screen. The screen may be closed upon ending of the copier job.

Following the copier job in S500 or the process in S510, in S520, the main controller 10 determines whether the screen on the display 31 has been switched to the data-receiving screen in response to the receipt-display process. Based on negative determination that the screen has not been switched to the data-receiving screen (S520: NO), in S410, the main controller 10 controls the display 31 to display the standby screen. On the other hand, based on affirmative determination that screen has been switched to the data-receiving screen (S520: YES), the main controller 10 proceeds to S530.

In S530, the main controller 10 waits until the data-receiving screen is closed. Thereafter, the main controller 10 returns to S410 and controls the display 31 to again display the standby screen. According to these flows of the receipt-display process and the operation accepting process, in response to receipt of the print job data while the standby screen is being displayed, the main controller 10 controls the display 31 to display the data-receiving screen so that the user should not input an operation to the image printing apparatus 1 through the standby screen. Thus, an operation concerning the copier job is restrained from entering. Meanwhile, in response to receipt of the print job data while the copier setting screen is being displayed, the main controller 10 controls the display 31 to suspend from displaying the data-receiving screen until the copier setting screen is closed so that the user's operation to the copier setting screen should be accepted.

As described above, the image printing apparatus 1 according to the first embodiment may control the print driver 50 and the conveyance driver 60 to execute the warm-up actions for printing an image, including the head-warm-up action to warm up for driving the recording head 80 and a feeder-warm-up action, in response to receipt of the preliminary data by the communication interface 20 in the print controlling process. Further, the main controller 10 may control the print driver 50 and the conveyance driver 60 to execute the process for the print job data in response to receipt of the print job data containing the print data by the communication interface 20 so that the image based on the print data is formed.

Further, in the receipt-display process, the main controller 10 controls the display 31 not to display the data-receiving screen in response to receipt of the preliminary data but to display the data-receiving screen in response to receipt of the print job data so that the user may be notified of occurrence of a data-receiving event. Moreover, the main controller 10 controls the cancellation switch 35B to turn the illumination on in response to receipt of the print job data so that a cancellation operation by the user to cancel the process for the print job data may be accepted.

Meanwhile, the information processing apparatus 5 is configured to transmit the preliminary data and the print job data in response to the user's print instruction entered through the information processing apparatus 5. In this configuration, it may be preferable that the image printing apparatus 1 is configured to display the data-receiving screen to inform the user of the status that the process for the print instruction is in progress.

In this regard, in the present embodiment, the data-receiving screen is displayed in response to receipt of the print job data. In other words, the data-receiving screen is not displayed in response to receipt of the preliminary data; therefore, without an extra step to display the data-receiving screen, input of the commands from the main controller 10 to the print driver 50 and the conveyance driver 60 to execute the warm-up actions may be prevented from being delayed. Accordingly, the warm-up actions may be started promptly, and the processes based on the preliminary data and the print job data may be performed efficiently.

Further, according to the present embodiment, when the ink is running out and the print job might be interrupted or might not be performed correctly, the user is notified of the erroneous condition regarding the insufficient ink. Thus, according to the present embodiment, when the image printing apparatus 1 is not in condition for performing the print job correctly, the image printing apparatus 1 may alert the user to the error promptly. Thus, the image printing apparatus 1 with improved usability may be provided to the user.

Further, according to the image printing apparatus 1 of the present embodiment, within a length of transitive period, from receipt of preliminary data, with the main controller 10 receiving the print data for the first path unit, and until the main controller 10 is warmed up to start the process for the print job data, the main controller 10 is enabled to accept an instruction for a copier job through the copier setting screen while performing the process for the data received from the information processing apparatus 5. Thus, with the image printing apparatus 1, the copying action and the image printing action associated with the print job data from the information processing apparatus 5 may be efficiently performed according to the user's requests.

Further, according to the image printing apparatus 1 of the present embodiment, the main controller 10 may control the display 31 to display the data-receiving screens based on an order of receiving print job data rather than a receiving order of preliminary data (S360) to perform the process for the print job data (S250).

According to the present embodiment, there may be a case, in which a plurality of print instructions are input sequentially in one or more information processing apparatuses 5. In such a case, one or more information processing apparatuses 5 may transmit units of preliminary data and units of print job data to the image printing apparatus 1 according to the flow of S110-S130 in each of the information processing apparatuses 5. Therefore, the communication interface 20 in the image printing apparatus 1 may receive the plurality of units of preliminary data according to the order of input of the print instructions and the plurality of print job data according to the receiving order of the preliminary data.

For example, as shown in FIG. 10, while a print instruction X may be input earlier and a print instruction Y may be input later, a unit of preliminary data X1 associated with the earlier print instruction X and a unit of preliminary data Y1 associated with the latter print instruction Y may be received by the communication interface 20 in the chronological order of the inputs. However, due to environmental causes of the data communication, there may be an event, in which a unit of print job data X2 associated with the earlier print instruction X and a unit of print job data Y2 associated with the latter print instruction Y are not received in the chronological order of the print instructions X, Y but may be received in a different order. For example, the print job data Y2 may be received earlier than the print job data X2. Such a shuffling event may likewise occur due to variation of lengths of processing time for converting the print-objective data to the print data, which may depend on loads of processes.

In such an event, for example, if the plurality of units of print job data are processed in the order of receiving the plurality of units of preliminary data, a process for the print job data Y2 received earlier should be performed later than a process for the print job data X2 received later. In other words, the print jobs may not be handled efficiently.

In contrast, according to the present embodiment, as shown in FIG. 10, the process for the print job data Y2 and the process for the print job data X2 are performed (S250) in the order of receiving regardless of the receiving order of the preliminary data. In other words, the process for the print job data Y2 received earlier may be performed antecedently over the process for the print job data X2 received later. Further, in parallel with the processes for the print job data Y2 and the print job data X2, the data-receiving screen associated with the print job data Y2 and the data-receiving screen associated with the print job data X are displayed (S360).

Thus, according to the present embodiment, the processes for the print job data X2, Y2 may be handled efficiently, and the data-receiving screens may be displayed according to the efficient handling order so that the image printing apparatus 1 with the improved usability may be provided to the user.

Further, according to the present embodiment, while the main controller 10 is conducting a warm-up action, which is started in response to receipt of the preliminary data, and in response to the communication interface 20 receiving new preliminary data, the main controller 10 makes negative determination in S220 so that the flow of steps S221-S225 for the newly received preliminary data should be avoided, and so that the warm-up action may be continued. Thus, the warm-up action may be correctly performed.

Furthermore, according to the present embodiment, it may be advantageous that a cancellation command is acceptable. That is, once two units of preliminary data X1 and Y1 are received, two units of print job data Y2, X2 may be received, and processes for the received print job data Y2, X2 may start subsequently. In this regard, if a cancellation operation to cancel one of the two units of the print job data Y2, X2 was acceptable before either one of the process for the print job data Y2, X2 is started, the other one of the two units of the print job data Y2, X2 may be erroneously cancelled against the user's intention. Meanwhile, a cancellation command, which is entered while the main controller 10 is in progress to perform a process for job data, may likely be a cancellation command to cancel the process in progress. Therefore, with the image printing apparatus 1 capable of accepting the cancellation command, the job data to match the user's intention may be cancelled correctly.

It may be noted that the image printing apparatus 1 may be alternatively equipped with a user interface 400 (see FIG. 11) rather than the user interface 30. The user interface 400 shown in FIG. 11 may include a receive-indicator lamp 410, a simplified liquid crystal display 420, and a push-responsive cancellation button 430.

With the user interface 400 shown in FIG. 11, the main controller 10 may perform a process to turn on the receive-indicator lamp 410 in place of controlling the display 310 to display the data-receiving screen in S360 (FIG. 8) and a process to turn off the receive-indicator lamp 410 in S380 (FIG. 8). While the receive-indicator lamp 410 is turned on, the main controller 10 may control the simplified liquid crystal display 420 to display a smaller number of words, such as "receiving . . . " so that the user may be informed of the receiving action of the communication interface 20 through the visual indication from the receive-indicator lamp 410 and the simplified liquid crystal display 420.

Optionally or alternatively, the steps of S321 and S325 may be performed to alert the user to insufficient supply when consumable items which are required for image printing are insufficient. The consumable items may include, for example, the ink and the sheet Q. For example, when the sheet Q in one of the sheet feeder trays is insufficient, the main controller 10 may make affirmative determination in S321 and start a process to alert the user to the insufficient sheet in S325.

For another example, in S321, the main controller 10 may make affirmative determination in response to an event where the sheet Q is jammed and start a process to alert the user to the sheet jam in S325.

Second Embodiment

Next, the image printing apparatus 1 according to a second embodiment will be described below. The image printing apparatus 1 in the second embodiment is configured to be similar to the image printing apparatus 1 in the first embodiment but is different in some aspects, which will be described below. In the following description, explanation of items and structures in the image printing apparatus 1 which are identical or equivalent to those described with regard to the image printing apparatus 1 in the first embodiment will be omitted.

The image printing apparatus 1 in the second embodiment is configured to execute a predetermined notifying action, by executing a receipt-display process shown in FIG. 12, in place of the receipt-display process (see FIG. 8) in the first embodiment.

The receipt-display process includes step S610, which is an additional step to the receipt-display process in the first embodiment. Therefore, in response to receipt of the preliminary data from the information processing apparatus 5 (S320: YES), in S321, the main controller 10 determines whether the ink to be supplied to the recording head 80 is insufficient. Based on affirmative determination that the ink is insufficient (S321: YES), the main controller 10 proceeds to S325. Based on negative determination that the ink is not insufficient (S321: NO), the main controller 10 proceeds to S610 and thereafter ends the current receipt-display process.

In S610, the main controller 10 controls the display 31 to display a notification screen as shown in FIG. 13. The notification screen may contain a message to notify the user of a printing action being in warming-up. The notification screen to be displayed in response to receipt of the preliminary data may be different from the data-receiving screen to be displayed in response to receipt of the print data in the message to be displayed.

While the notification screen is being displayed, the cancellation switch 35B is not illuminated. The cancellation switch 35B is illuminated in S340, in the similar manner as S340 in the first embodiment, in response to receipt of the print data. The notification screen is closed in response to display of the data-receiving screen.

In association with the notification screen being displayed in response to receipt of the preliminary data, the main controller 10 acts in S440 and S520 in the operation-accepting process (see FIG. 9) in the following manner. That is, in S440, the main controller 10 determines whether the standby screen having been displayed on the display 31 is switched to the notification screen. Based on the determination that the standby screen has switched to the notification screen (S440: YES), in S530, the main controller 10 waits until an end of displaying a data-receiving screen associated with the notification screen. Thereafter, the main controller 10 returns to S410 and controls the display 31 to again display the standby screen.

Following the copier job in S500 or the process in S510, in S520, the main controller 10 determines whether the screen on the display 31 has been switched to one of the notification screen and the data-receiving screen. Based on affirmative determination that screen has been switched to the notification screen or the data-receiving screen (S520: YES), the main controller 10 proceeds to S530.

According to the image printing apparatus 1 configured as above, the notification screen is displayed based on the receipt of the preliminary data. Thereby, the user inputting the print instruction may note in a timely fashion that the process based on the print instruction is in progress. Thus, the image printing apparatus 1 which may be useful to the user in an aspect may be provided. Meanwhile, however, according to the image printing apparatus 1 of the second embodiment, the screen on the display 31 is switched upon receipt of the preliminary data to the notification screen, and the user may not input an operation concerning a copier job. In this regard, the image printing apparatus 1 may be configured to execute the notifying action in response to the preliminary data in a different manner, which is, for example, as described below in a third embodiment.

Third Embodiment

Next, the image printing apparatus 1 according to the third embodiment will be described below. The image printing apparatus 1 in the third embodiment is configured to be similar to the image printing apparatus 1 in the first embodiment but is different in some aspects, which will be described below. In the following description, explanation of items and structures in the image printing apparatus 1 which are identical or equivalent to those described with regard to the image printing apparatus 1 in the first embodiment will be omitted.

The image printing apparatus 1 in the third embodiment is equipped with a user interface 500, as shown in FIG. 14, in place of the user interface 30. The user interface 500 is in a configuration such that a lamp 510 is added to the user interface 30.

The image printing apparatus 1 in the third embodiment is configured to execute a notifying action using the lamp 510, by executing a receipt-display process shown in FIG. 12, in place of the receipt-display process (see FIG. 8) in the first embodiment.

The receipt-display process to be executed in the image printing apparatus 1 in the third embodiment may be similar to the receipt-display process in the second embodiment largely. However, the receipt-display process in FIG. 12 include S610, in which the main controller 10 controls the lamp 510 to blink without having the display 31 to display the notification screen, as shown in an upper part of FIG. 14. Thereby, the user may be notified of the print action being in warming-up. While the lamp 510 is blinking, the cancellation switch 35B is not illuminated. The cancellation switch 35B may be illuminated in S340, similarly to S340 in the second embodiment, in response to receipt of the print data.

While receiving the print job data, in S340, the main controller 10 illuminates the cancellation switch 35B and turns the lamp 510 on to illuminate steadily without blinking, as shown in a lower part of FIG. 14. The lamp 510 is thereafter switched off together with switching off of the illumination of the cancellation switch 35B. Meanwhile, the operation-accepting process is conducted in the similar manner to operation-accepting process in the first embodiment. According to the present embodiment, a command to activate a copier job may be accepted through the copier setting screen while the print job is being warmed up. Thus, the image printing apparatus 1 with improved usability may be provided.

Although examples of carrying out the present disclosure have been described, those skilled in the art will appreciate that there are numerous variations and permutations of the sheet conveyor and the image printing apparatus that fall within the spirit and scope of the disclosure as set forth in the appended claims. It is to be understood that the subject matter defined in the appended claims is not necessarily limited to the specific features or act described above. Rather, the specific features and acts described above are disclosed as example forms of implementing the claims.

What is claimed is:

1. An image printing apparatus comprising:
   a communication interface;
   a printer;
   a user interface including an operation panel and a cancellation input device; and
   a controller configured to control the printer and the user interface;
   wherein the controller is configured to:
      receive preliminary data sent from an information processing apparatus through the communication interface;
      in response to receipt of the preliminary data, control the printer to perform a warm-up action for warming up the printer;
      receive job data including image data through the communication interface, the job data being sent after the preliminary data from the information processing apparatus;
      based on the receipt of the job data, control the user interface to perform a receipt-notification to notify the user of the receipt and control the printer to start printing based on the image data included in the job data;
      during a period from the receipt of the preliminary data until start of receiving the job data, turn the cancellation input device off; and
      after the start of receiving the job data, turn the cancellation input device on and accept a cancellation operation.

2. The image printing apparatus according to claim 1, wherein the controller is configured to:
   withhold from accepting a cancellation command for the cancellation operation during the period from the receipt of the preliminary data until the start of the receiving the job data; and
   accept the cancellation command and cancel printing of the image based on the job data associated with the entered cancellation command after the start of receiving the job data.

3. The image printing apparatus according to claim 2, wherein the controller is configured to, based on receipt of a plurality of units of the job data, control the user interface to perform the receipt-notification for an earlier one of the plurality of units of the job data which is received earlier antecedently over the receipt-notification for the other of the plurality of units of the print job data received later.

4. The image printing apparatus according to claim 3, wherein the controller is configured to, after the start of receiving the earlier one of the plurality of units of the job data, turn the cancellation input device on to accept the cancellation command and cancel the printing of the image based on the image data included in the earlier one of plurality of units of the job data associated with to the entered cancellation command.

5. The image printing apparatus according to claim 3, wherein the controller is configured to, in response to the receipt of a plurality of units the preliminary data, control the printer to perform the warm-up action for the earlier one of the plurality of units of the preliminary data.

6. The image printing apparatus according to claim 1, wherein the controller is configured to, in response to the receipt of the job data before completion of the warm-up action, control the user interface to perform the receipt-notification and turn the cancellation input device on in parallel with the warm-up action.

7. The image printing apparatus according to claim 1, wherein the controller is configured to, in response to receipt of a sufficient amount of the image data included in the job data, control the user interface to perform the receipt-notification, the sufficient amount of the image data corresponding to an amount of the image data required for the printer to start printing the image.

8. The image printing apparatus according to claim 1, wherein the controller is configured to, in response to the receipt of the preliminary data, control the user interface to perform a predetermined notification to the user.

9. The image printing apparatus according to claim 8, wherein the receipt-notification and the predetermined notification are different manners.

10. The image printing apparatus according to claim 9, wherein the user interface comprises at least one of a display and a lamp; and
    wherein the controller is configured to, in the receipt-notification, operate the at least one of the display and the lamp.

11. The image printing apparatus according to claim 10, wherein the user interface comprises the display and the lamp;
    wherein the controller is configured to, in the predetermined notification, operate the lamp; and
    wherein the controller is configured to, in the receipt-notification, operate the display.

12. The image printing apparatus according to claim 11, wherein the controller is configured to, in the predetermined notification, operate the lamp to blink or steadily turn on.

13. The image printing apparatus according to claim 12, wherein the controller is configured to, in the receipt-notification, operate both the lamp and the display.

14. The image printing apparatus according to claim 1, wherein the controller is configured to determine an occurrence of an error to interrupt the printing of the image in the printer; and
    wherein the controller is configured to, in response to the receipt of the preliminary data and to the determination of the occurrence of the error, control the user interface to perform an error notification to the user.

15. A method for controlling an image printing apparatus, comprising:
    receiving preliminary data sent from an information processing apparatus through a communication interface of the image printing apparatus;
    in response to receipt of the preliminary data, controlling a printer of the image printing apparatus to perform a warm-up action for warming up the printer;

receiving job data including image data through the communication interface, the job data being sent after the preliminary data from the information processing apparatus;

based on the receipt of the job data, controlling a user interface of the image printing apparatus to perform a receipt-notification to notify the user of the receipt and controlling the printer to start printing based on the image data included in the job data;

during a period from the receipt of the preliminary data until start of receiving the job data, turning a cancellation input device of the image printing apparatus off; and after the start of receiving the job data, turning the cancellation input device on and canceling printing of the image based on the job data associated with the entered cancellation command.

* * * * *